Figure 1:
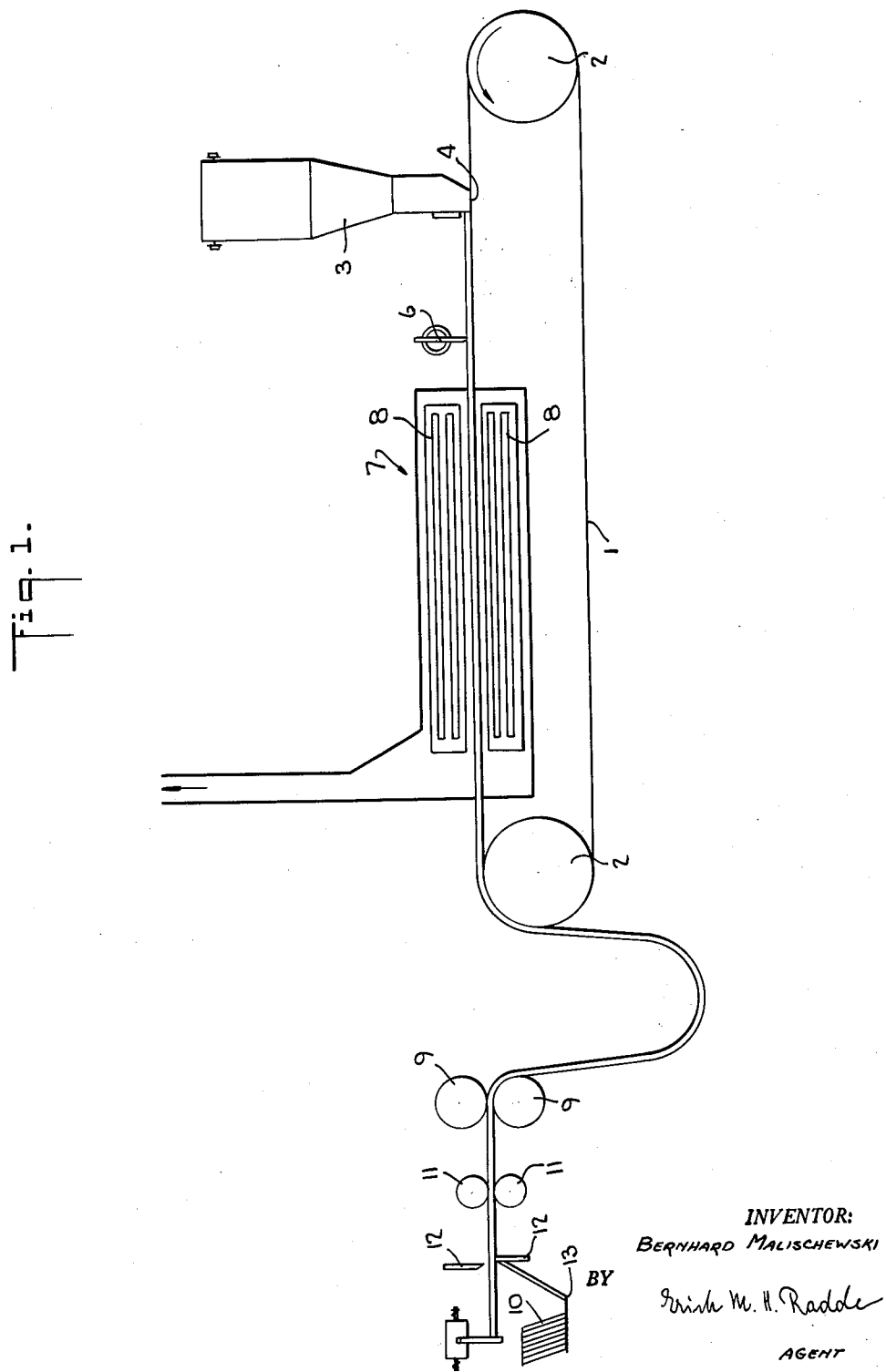

March 3, 1964 B. MALISCHEWSKI 3,123,654
MANUFACTURE OF MICROPOROUS PLASTIC SEPARATORS
FOR STORAGE BATTERIES
Filed Oct. 12, 1959 2 Sheets-Sheet 1

INVENTOR:
BERNHARD MALISCHEWSKI
BY
Erich M. H. Radde
AGENT

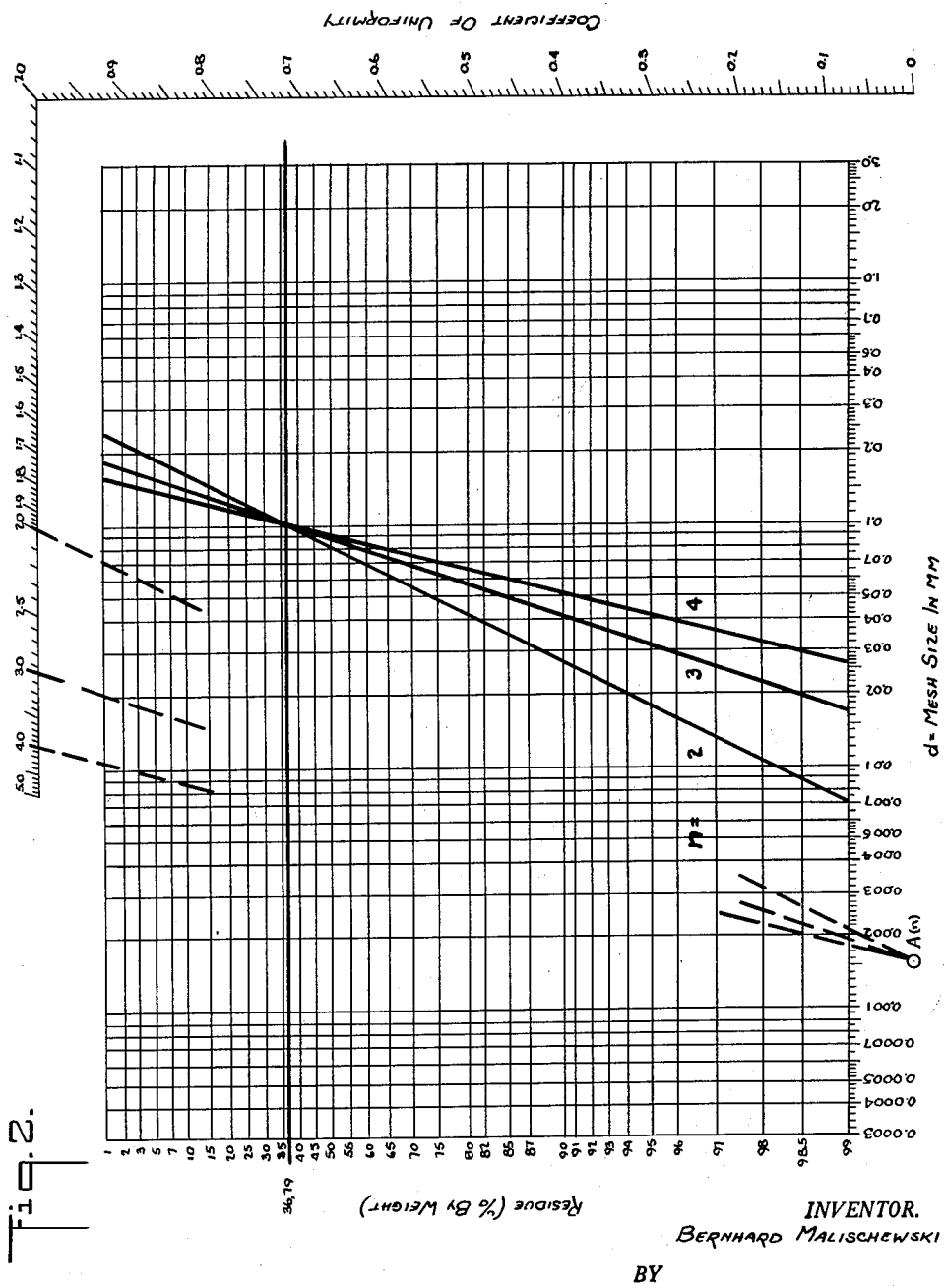

United States Patent Office 3,123,654
Patented Mar. 3, 1964

3,123,654
MANUFACTURE OF MICROPOROUS PLASTIC SEPARATORS FOR STORAGE BATTERIES
Bernard Malischewski, Hannover, Germany, assignor to Varta Aktiengesellschaft, Hagen, Westphalia, Germany, a company of Germany
Filed Oct. 12, 1959, Ser. No. 845,905
11 Claims. (Cl. 264—126)

The present invention relates to improvements in a process of manufacturing microporous plastic separators for storage battery cells, and more particularly to a process of producing such separators from plastic granules, preferably of a grain size of 0.05 mm. to 0.15 mm., by subjecting the pulverulent plastic to a controlled heat treatment.

While polyvinylchloride is the preferred starting material for the process of this invention, any suitable thermoplastic resin may be used provided it is electrically non-conductive and inert to the acid in the cell.

The production of storage battery separaors by heat treating thermoplastic resin powders to coalesce the resin granules into a microporous sheet is known. The radius of the pores of such separators, however, is too large to assure the required rigidity of the separator while the volume of their pores is so small that the battery shows an undesirably high resistance. The large pore radii also increase the danger of short circuiting between the positive and negative plates by migration of the active material from one of said plates to the other one through the pores. The relatively small pore volume, on the other hand, decreases the acid volume and thus leads to a decrease in the capacity of the battery. Furthermore, the porosity of known separators of this type is not uniform since the size of the separator pores depends not only on the grain size of the starting material but also on the coefficient of uniformity of the pulverulent material and differences in the grain dimensions in various directions.

It is the principal object of the present invention to produce a microporous plastic storage battery separator of sufficient mechanical rigidity to assure proper battery operation while having a large pore volume despite its relatively small pore radii.

The above and other objects and advantages are accomplished in accordance with this invention by providing a separator, the mean pore radius of which is between about $0.5\mu$ and about $30\mu$, preferably smaller than $20\mu$, the pore volume of said separator exceeding about 60% or more. More particularly this result is achieved by using as starting material a thermoplastic resin powder the grain size of which has been defined by limiting grading curves and which is classified to have a granular uniformity coefficient of 2 to 4, preferably about 3, the differences in the dimensions of the powder granules in any direction not exceeding a ratio of 1:3. The grain size of the material is between about 0.05 mm. and about 0.15 mm. The sintering conditions depend on the thermoplastic resin used. Thus, the preferred material, polyvinyl chloride, is subjected to a heat treatment at a temperature of 230° C. to 280° C., preferably at about 250° C., for less than 30 seconds, for instance, for 10 seconds to 25 seconds. A similar separator of high pressure polyethylene would be produced by sintering the powder at a temperature of 270° C. to 285° C. while the powder carrier passes through the sintering oven at a speed of about 0.9 m./min.. Low-pressure polyethylene would be heat treated at a temperature of 240° C. to 260° C. at a passing speed of about 0.6 m./min. The corresponding values for polypropylene are 250° C. to 270° C. at a speed of about 1 m./min.

Determination of the limiting grading curves and of the granular uniformity coefficient is carried out according to Rosin-Rammler-Bennett as described by E. Rammler in "Zeitschr. Ver. dtsch. Ing., Beih. Verfahrenstechnik" 161/68 (1937).

The molecular weight of the thermoplastic resin determines such factors as the softening point, the mechanical strength and many physical properties. I have found that resins with a molecular weight between about 30,000 and about 100,000 are best suited for the purposes of the present invention. The preferred molecular weight of the resins is between about 40,000 and about 60,000. Mixtures of polymers of different molecular weight and/or obtained by different methods have been successfully used. One preferred mixture consists of 90% of a large-grained suspension polyvinylchloride having a molecular weight between about 40,000 and about 85,000 and 10% of a fine-grained emulsion polyvinylchloride of a molecular weight between about 80,000 and about 90,000.

By way of example and without in any way limiting the invention thereto, the accompanying drawing shows a simple apparatus for carrying out the process of this invention and a preferred separator so produced. In the drawing, FIG. 1 is a schematic side view of an apparatus; and
FIG. 2 is a graph illustrating the empirically obtained particle distribution according to Rosin-Rammler.

Referring now to FIG. 1, the apparatus for producing microporous plastic separators according to the invention is shown to comprise an endless steel band 1 supported on a pair of rollers 2, 2. Band 1 may suitably consist of any flexible, heat-resistant material which is inert to the heat-treated plastic, such as aluminum, non-oxidizing steel, heavy kraft paper impregnated with a phenolic resin, and like materials. At one end above the endless band 1 there is supported a means for feeding a layer of pulverulent material to the band, the illustrated feeding means consisting of a hopper 3 having a slot 4 the width of which may be adjusted in accordance with a desired separator thickness. The feeding of the pulverulent plastic will be facilitated if the hopper is vibrated or if the hopper feeds the material to a vibratory conveyor which, in turn, deposits the powder on endless band 1. If desired, the feeding of the pulverulent material may be effected by the apparatus described and claimed in copending application Serial No. 744,288, filed June 24, 1958, now Patent No. 3,024,948, by Richard Rabl and entitled "Apparatus for Forming a Layer of Pulverulent Material," or by the apparatus shown in Austrian Patent No. 188,096.

In the example illustrating the process of the invention, pulverulent polyvinylchloride, and especially polyvinylchloride obtained by emulsion polymerization is used for the manufacture of the separators. The resin is first classified by passing it through a sieve and eliminating all granules of a size exceeding $120\mu$. Preferably, but not necessarily, granules of a diameter of less than $50\mu$ are also removed. The mesh of the classifying sieves is such that the uniformity coefficient of the classified material is about 2 and that none of the granules has dimensions exceeding the ratio of 1:3 in any direction. The classified polyvinylchloride is then supplied to hopper 3. Since even the adjustment of slot 4 of the hopper does not assure accurate dosing of the starting material, a doctor blade 6 is arranged adjacent the feed end of the endless band 1. The doctor blade may oscillate over the pulverulent material deposit at a frequency of 3600 strokes per minute to remove excess material from the deposited layer.

Since thermoplastic materials notoriously are subject to accepting electrosatic charges, which may change the spatial relationships of the granules in the layer, an ionizing means of any suitable conventional design may be arranged in the path of the steel band 1 between the feed end and the heating means to remove any electrostatic charges from the material. The illustrated heating means consists of an oven 7 holding two electric heating resistance elements 8, 8 wherebetween the endless band 1 with its destaticized plastic layer moves at a predetermined speed. If desired, the heating elements may be so constructed that a plurality of heating zones of differing temperatures are provided, the temperature increasing from zone to zone as the band passes therethrough. The heating time may be controlled by adjusting the speed of the endless band 1 within the range of 0.5 m. to 1.3 m. per minute, for which purpose an infinitely variable speed control mechanism (not shown) may be provided. The heating time and correlated temperature will determine the physical properties of the microporous separator produced in this manner.

Excellent results were achieved with pulverulent polyvinylchloride which was classified in the indicated manner and subjected to temperatures between 230° C. and 250° C. while the steel band 1 travelled between elements 8, 8 at a speed of 0.8 m./min. Equally good results were achieved with the same material at a band speed of 1.3 m./min. and temperatures of 250° C. to 280° C. Many speeds between these limits and with this temperature range were tried and gave satisfactory results, the end products differing primarily in their porosity. The higher the temperature and the longer the treatment, the denser is the resultant separator blank.

In the heating chamber, the polyvinylchloride granules coalesce into an integral, microporous sheet and this sheet is preferably corrugated in an adjacent molding zone. In this zone, the microporous polyvinylchloride sheet is maintained at a temperature adapted to soften the sheet sufficiently to permit its deformation, i.e., at about 65° C. to 75° C. This may be done in any suitable manner, for instance, by heating the corrugated rollers 9, 9 which impart to the sheet the desired corrugations which may, for instance, have a width between 1.6 mm. and 2.4 mm., the advantage of corrugated separators being known and appreciated in the art.

Subsequent to its formation and, if desired, corrugation, the microporous sheet is cooled and cut to size to form individual separators 10, as shown in FIG. 3. The width of the plates is determined by the rotary knives 11, 11 while the plates are cut to their appropriate length by cooperating knives 12, 12. The plates 10 are then stacked in container 13.

It has been found that the relative humidity of the ambient atmosphere is of considerable importance during the screening of the separator material because the electrostatic charges on the pulverulent material are considerably reduced when the humidity is high. It has been found to be most advantageous if screening is effected at a relative humidity between about 60% and about 90%, preferably between about 70% and about 85%, at a temperature of about 25° C. to 30° C.

The particle distribution of the pulverulent plastic is generally determined by the equation $$P = 100e^{-\left(\frac{d}{d'}\right)^n}$$

as empirically found by Rosin-Rammler and as illustrated in the graph of FIG. 2. In this formula, P is the residue (in percentage by weight) of particles remaining after classifying the powder in a sieve of the mesh size $d$;

$d'$ is the equivalent particle size of a statistically determined average particle when $P=36.8\%$, recently simply called "particle size";

$n$ is the coefficient of uniformity, recently also called number of uniformity.

As shown in the graph, if the logarithms of the particle diameters are entered on the abscissa and the double logarithms of the reciprocal residue P, i.e.

$$\log \frac{100}{P}$$

are entered on the ordinate, a straight line may be drawn through all the values of P and the value $d'$ may then be read on the abscissa where the straight lines cross the 36.8% line. Uniformity coefficient $n$ is the tangent of these straight lines.

In the graph, straight lines for $n=2$, 3 and 4 have been entered, the particle size $d'$ having been chosen as 0.1 mm. As can be seen, in the range of 1 to 99% by weight of the material, the particle sizes will vary as follows:

| $n=$ | 2 | 3 | 4 |
|---|---|---|---|
| From $\mu$ | 7 | 17 | 26 |
| To $\mu$ | 230 | 170 | 150 |

While the invention is specifically described in connection with polyvinylchloride treated in the indicated manner, any pulverulent thermoplastic resin may be used if its granules coalesce under the given temperature conditions and if it is electrically non-conductive and substantially inert to sulfuric acid or other acids which may be used in storage batteries, some useful resins having been indicated hereinabove. Other polymers, copolymers, and polymer blends of styrene, acrylonitrile, vinyl compounds, vinylidene compounds and many other substances may be used for the process of this invention if they are classified in the indicated manner. Polyvinylchloride is, however, preferred.

The rigidity of the separators may be improved by adding certain organic substances to the resins, such as sugar, starch, or cellulose. Polystyrene with added cellulose has been found effective, for instance.

Also, if desired, the pore volume of the separators may be influenced by certain inorganic additives. Kieselguhr or carbon black may be added to the resin, for instance polyethylene or polystyrene, the inorganic additive usually not exceeding between about 3% and about 5%, by weight of the total composition. Gas-evolving substances, such as ammonium carbonate or urea, could also be used for this purpose.

Separators produced according to the indicated procedure have a porosity of about 60% or more and, therefore, have a particularly low electric resistance. Microporous separators of the prior art have a resistance of 0.4 ohm to 0.5 ohm/cm.² while polyvinylchloride separators produced according to the present invention have been found to have a resistance of only 0.14 ohm to 0.22 ohm/cm.². Numerous experiments have shown that these separators have a high mechanical rigidity despite their exceptionally high porosity and low electric resistance. The structure of the separator produced by this method also imparts to it unusual resistance to high temperatures. Accordingly, these novel separators are superior to conventional microporous plastic separators with respect to their mechanical, electrical, and thermal properties. At the same time, the production costs are no higher than those of the cheapest separators available on the market.

Another notable advantage of the process according to the present invention resides in the fact that the microporous blank may be corrugated. In view of the special porous structure of the blank produced in accordance with the present invention, the blank may be corrugated after its formation without disadvantageously influencing the size of volume of the pores and/or the pore radius. Thus, as shown in the illustrated example, the freshly formed sheet may be led through a molding zone and corrugated in a continuous operation. The corrugating roller may be cooled or the corrugated sheet may be subsequently be cooled before it is cut to size. Previously known microporous plastic sheets did not have the type of porous structure which permitted such corrugation without deterioration of the separator characteristics.

Corrugation lends added rigidity to the separators as well as increased elasticity and uniformly low electric resistance over their entire surface. In known microporous plastic separators reinforcing ribs had to be provided because corrugation after formation was not feasible. Such ribs cause increased electric resistance so that the resistance is not uniform throughout the surface of such separators. Furthermore, the reinforcing ribs reduce the elasticity of the separator far below that of corrugated ones.

While the invention has been described in detail in connection with certain preferred embodiments, it will be clearly understood that many changes and modifications may occur to the skilled in the art without departing from its spirit and scope as defined in the appended claims.

I claim:

1. In a process of manufacturing a microporous plastic separator for storage battery cells, the steps which comprise classifying a pulverulent thermoplastic resin to obtain a starting material whose uniformity coefficient is between about 2 and 4, whose granules have a size between about 0.05 mm. and 0.15 mm. with differences in the dimensions of the granules in any direction not exceeding a ratio of 1:3, depositing the pulverulent classified starting material loosely in a layer, and subjecting the layer of pulverulent starting material to a short heat treatment sufficient to coalesce the granules and to form a microporous sheet.

2. The process of claim 1, wherein the uniformity coefficient of the starting material is about 3.

3. The process of claim 1, wherein the thermoplastic resin is polyvinylchloride.

4. The process of claim 1, wherein the resin is classified at a temperature between 25° C. and 30° C. and a relative humidity between about 60% and about 90%.

5. In a process of manufacturing a microporous polyvinylchloride separator for storage battery cells, the steps which comprise classifying pulverulent polyvinyl chloride to obtain a starting material whose uniformity coefficient is between about 2 and 4, whose granules have a size between about 0.05 mm. and 0.15 mm., with differences in the dimensions of the granules in any direction not exceeding a ratio of 1:3, depositing the pulverulent classified polyvinylchloride loosely in a layer, and subjecting the layer of pulverulent polyvinylchloride granules in the absence of pressure to a temperature of between about 230° C. and 280° C. for less than 30 seconds to coalesce the granules and to form a microporous polyvinylchloride sheet.

6. The process of claim 5, wherein the uniformity coefficient of the polyvinylchloride starting material is about 3.

7. The process of claim 5, wherein the temperature is about 250° C.

8. The process of claim 5, wherein the polyvinylchloride is classified at a temperature between 25° C. and 30° C. and a relative humidity between about 60% and about 90%.

9. In a continuous process of manufacturing microporous plastic separators for storage battery cells, the successive steps of classifying a pulverulent thermoplastic resin to obtain a starting material, the uniformity coefficient of which is between about 2 and about 4, the granules of which have a size between about 0.05 mm. and about 0.15 mm., with differences in the dimensions of the granules in any direction not exceeding a ratio of 1:3, depositing the pulverulent classified starting material loosely in a continuous layer, continuously passing the layer of the pulverulent starting material through a heating zone, subjecting the layer of the pulverulent starting material in the absence of pressure to a short heat treatment in the heating zone which is sufficient to coalesce the granules and to form a continuous microporous sheet, continuously passing the continuous microporous sheet from the heating zone into a shaping zone, continuously corrugating the microporous sheet as it passes through the shaping zone, and cutting the corrugated microporous sheet into said separators.

10. The process of claim 1, wherein the thermoplastic resin is a mixture of a suspension polymer and an emulsion polymer.

11. The process of claim 1, wherein the thermoplastic resin is a mixture of about 90% of a large-grained suspension polyvinylchloride having a molecular weight between about 40,000 and about 85,000 and about 10% of a fine-grained emulsion polyvinylchloride of a molecular weight between about 80,000 and about 9,000.

References Cited in the file of this patent

UNITED STATES PATENTS

| | | |
|---|---|---|
| 2,155,016 | Kershaw | Apr. 18, 1939 |
| 2,297,248 | Rudolph | Sept. 29, 1942 |
| 2,371,868 | Berg et al. | Mar. 20, 1945 |
| 2,374,540 | Hall | Apr. 24, 1945 |
| 2,400,091 | Alfthan | May 14, 1946 |
| 2,422,148 | Uhlig | June 10, 1947 |
| 2,542,527 | Honey et al. | Feb. 20, 1951 |
| 2,555,225 | Doughty | May 29, 1951 |
| 2,573,639 | Coler | Oct. 30, 1951 |
| 2,734,095 | Mears et al. | Feb. 7, 1956 |
| 2,772,322 | Witt et al. | Nov. 27, 1956 |
| 2,889,390 | Schwartz | June 2, 1959 |
| 2,917,217 | Sisson | Dec. 15, 1959 |
| 2,960,727 | Bradshaw et al. | Nov. 22, 1960 |

FOREIGN PATENTS

| | | |
|---|---|---|
| 523,813 | Italy | Apr. 19, 1955 |
| 1,157,509 | France | May 30, 1958 |
| 725,950 | Great Britain | Mar. 16, 1955 |
| 796,612 | Great Britain | June 18, 1958 |
| 573,357 | Canada | Mar. 31, 1958 |
| 188,096 | Austria | Dec. 27, 1956 |
| 204,225 | Austria | July 10, 1959 |

OTHER REFERENCES

Kingery, W. D., ed., Ceramic Fabrication Processes, N.Y., John Wiley and Sons, Inc., © 1958, pages 55–58.